United States Patent [19]

Scheunemann

[11] 3,829,277

[45] Aug. 13, 1974

[54] MANTLE-RADIATION RECUPERATOR

[75] Inventor: Hans-Rudiger Scheunemann, Tonisvorst, Germany

[73] Assignee: Kleinewefers Industrie-Compagnie GmbH, Krefeld, Germany

[22] Filed: Jan. 10, 1973

[21] Appl. No.: 322,415

[52] U.S. Cl. .................. 431/109, 110/56, 432/223
[51] Int. Cl. .............................................. F21h 1/04
[58] Field of Search ....... 431/104; 432/223; 110/56; 122/1 R

[56] References Cited
UNITED STATES PATENTS 3,238,902   3/1966   Escher .................................. 110/56

FOREIGN PATENTS OR APPLICATIONS 77,891   3/1962   France .................................. 110/56

Primary Examiner—John J. Camby
Attorney, Agent, or Firm—Walter Becker

[57]   ABSTRACT

A mantle-radiation recuperator with a cylindrical mantle and a distributing chamber, in which the cylindrical mantle conveys the fluid to be heated up and is passed around by flue gases, and in which a recuperator mantle is suspended in a chimney which mantle is connected to supports the outer ends of which are adapted to be rested on the masonry of the chimney or a part connected thereto.

9 Claims, 6 Drawing Figures

MANTLE-RADIATION RECUPERATOR

The present invention relates to a mantle-radiation recuperator with a cylindrical mantle, manifold or jacket means and a distribution chamber, the cylindrical mantle conveying the fluid to be heated up and being passed around by flue gases.

In addition to pipe recuperators, mantle recuperators have become known, in which the heat transfer is effected primarily by radiation, and in which the fluid to be heated up is passed through an annular chamber between a cylindrical inner mantle and a cylindrical outer mantle, the flue gases being conveyed through the inner chamber of the cylindrical inner mantle. The cylindrical annular chamber conveying the fluid to be heated up may once more be subdivided by a further mantle so that the fluid to be heated up is conveyed first in the same direction as the flue gases or in counter current flow thereto through the recuperator and at its upper or lower end is deviated by 180° and then passed through the recuperator in opposite direction to its original direction of flow.

It is an object of the present invention to provide a mantle-radiation recuperator of the above mentioned type by means of which it will be possible to utilize the flue gases of a chimney, preferably a smoke stack, of an industrial plant, while realizing a high degree of efficiency.

It is a further object of this invention to provide a mantle-radiation recuperator as set forth in the preceding paragraph, which will not require any material expenses for the installation of the recuperator.

These and other objects and advantages of the invention will appear more clearly from the following specification in connection with the accompanying drawings, in which.

The arrangement according to the present invention is characterized primarily by a recuperator mantle structure which extends primarily over the height of the chimney and is adapted to be suspended therein, the recuperator mantle structure being connected to supporting means which extend over the cross section of the chimney and have their ends resting on the masonry of the chimney or a part connected thereto.

According to a further development of the invention, the ends of the supporting means extend through connecting pipe boxes of larger cross section between the mantle conveying the fluid to be heated up and the distributing box.

The invention is based on the idea of providing a recuperator over the entire length of the chimney while the weight of the recuperator is supported by a beam resting on the masonry of the chimney. The beams extend through the conveying means of the fluid to be heated up. The conveying means for the fluid to be heated up simultaneously form an encasement for the beams which are acted upon by the fluid to be heated up, so that the beams in spite of the fact that they extend into the chimney are cooled by the fluid to be heated up.

According to a further development of the invention, the beams or supports are arranged crosswise and symmetrically with regard to the mantle of the recuperator. According to a preferred embodiment of the invention, the supports or beams have their ends resting on a ring arranged on the masonry of the chimney or on a framework of the chimney. This ring extends through the connecting pipe boxes approximately at half the height thereof. In this way there will, on the one hand, be assured a distribution of the weight of the recuperator over the entire cross section of the chimney or the entire cross section of the framework while, on the other hand, there will be obtained a sufficiently large free cross section of the connecting pipe boxes for feeding the fluid to be heated up.

The mantle-radiation recuperator according to the invention may be of different designs. Thus, for instance, a displacement body or a second mantle may extend into the mantle conveying the fluid to be heated up. In this connection, the displacement body or the second mantle may likewise be arranged on the supports or beams so that the weight of the displacement body or of the second mantle will likewise be absorbed by the supports or beams. According to a further development of this design, one of the mantles or both mantles may be extended beyond the supports in upward direction and the inner chamber of a mantle may be connected to a collecting chamber.

Figure 2:
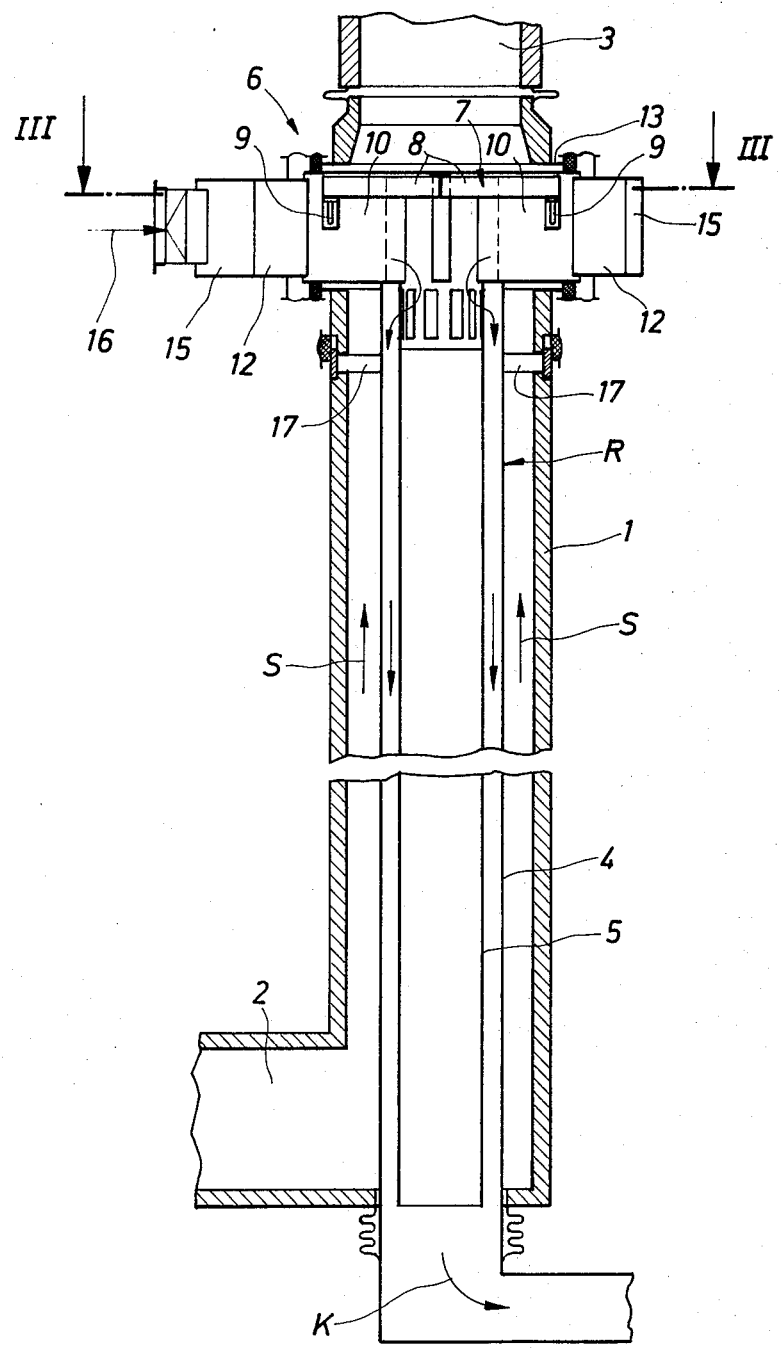
FIG. 2 is a longitudinal section through a second embodiment of the recuperator according to the invention.

Referring now to the drawings in detail, the recuperator R is suspended in the chimney 1 into which the flue gases are conveyed through the passage 2 (FIG. 2). The flue gases pass through the chimney in the direction of the arrows S and are withdrawn at the upper end of the chimney at 3. The chimney has in a manner known per se a circular cross section and may be surrounded by a framework.

The recuperator consists primarily of a cylindrical mantle 4, the inner mantle 5 coaxially arranged in the mantle 4, and the transfer and suspension device generally designated 6. The device 6 comprises a cross 7 formed by profiled beams 8 which are arranged along a plane, the cross having a larger inner diameter than the chimney 1. The ends of the beams 8 may therefore rest upon a profiled ring 9 which is placed around the chimney 1 and is supported either by the masonry of the chimney or by the framework for the chimney. The ends of the beams 8 may for reasons of strength be provided with reinforcing members 8a between the upper beam flange 8b and a lower flange element 8c at the level of the profiled ring 9.

The beams 8 have their outer section 8d extend into connecting pipe sections 10 which extend from the inner mantle 5 to an area outside the chimney. The connecting pipe have a rectangular cross section while their upper side 10a is located closely above the upper flange 8b of the beam 8. The connecting pipe boxes 10 extend far below the bottom side of the ring 9 so that between the lower side of the ring and the bottom 11 of each box 10 there is a sufficiently large cross section for conveying the fluid to be heated up. The area where the ring 9 passes through the walls of box 10 is sealed.

Between the chimney 1 and the radially extending connections 12 there is provided an additional short pipe box 13 which surrounds the connecting pipe box 10 while a seal 14 is provided between the two boxes. The connections 12 lead into the distributing chamber 15 which conveyes the fluid to be heated up in the direction of the arrow 16.

The two mantles 4, 5 of the recuperator are suspended on the cross 7 and may be held in their respective position by set screws 17 or the like. The part 4a, 4b of the mantles 4, 5 which extends beyond the cross 7 may, according to FIGS. 1, 5 and 6, rest upon the flange 8b of a beam 8 while annular extensions 4b, 5b reduce the specific bearing pressure upon the beams (FIG. 6). The mantles 4, 5 may, however, be suspended on the beams 8 in conformity with the design of FIG. 2.

Figure 1:
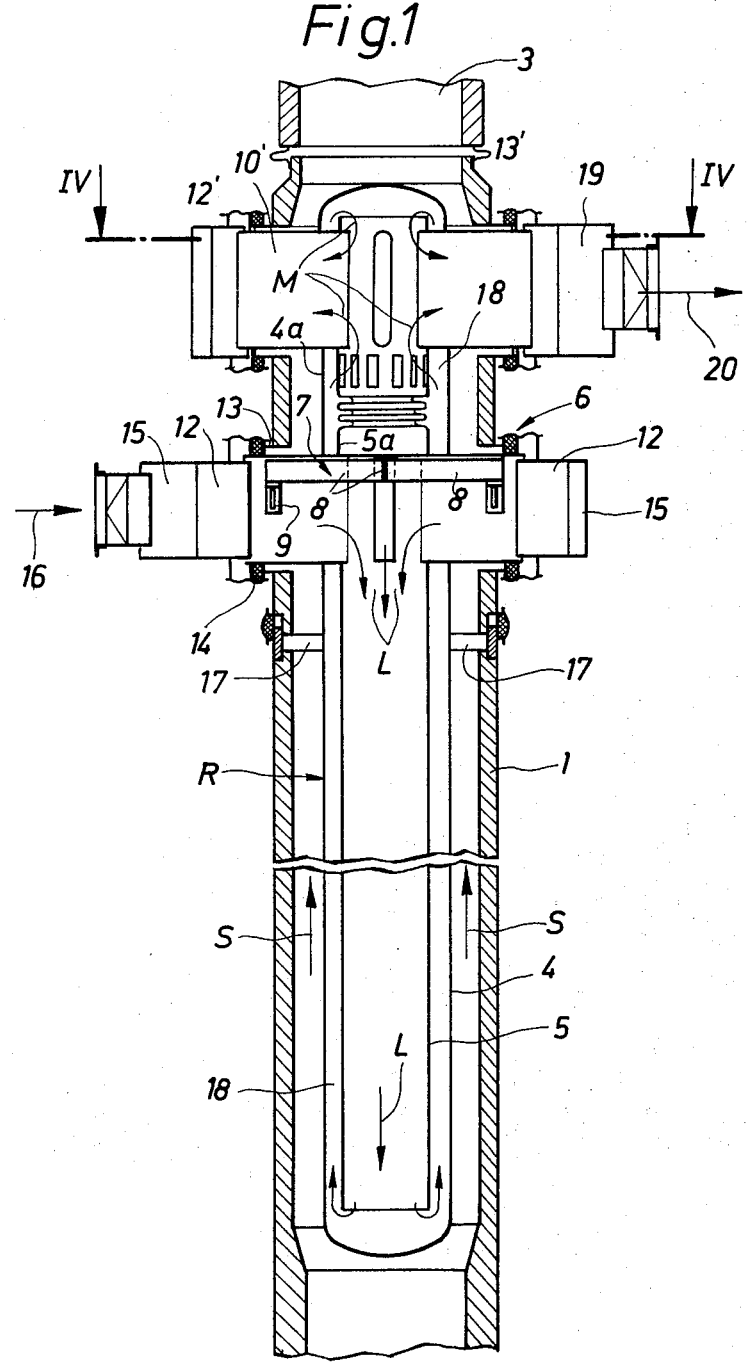
FIG. 1 illustrates one embodiment of a recuperator according to the invention, shown in a longitudinal section.

The fluid to be heated up is, according to the recuperator of FIG. 1, passed in the inner chamber of mantle 4 in the direction of the arrows L and at the lower end of the mantles 4, 5 is deviated into the annular chamber 18 so that it will flow past the connecting pipe boxes 10 to the collecting box 19 and will be withdrawn at 20. The collecting chamber 19 surrounds the radially arranged boxes and connections 10', 12' and 13' the arrangement and design of which corresponds to that of the boxes and connections 10, 12 and 13. The inner mantle 5 is closed above the suspension and conveying device 6 so that the heated up fluid will in the direction of the arrows M pass from the annular chamber 18 into the connecting boxes 10'.

With the recuperator according to FIG. 2, the heated up fluid flows in the direction of the arrow X out of the recuperator.

Figure 5:
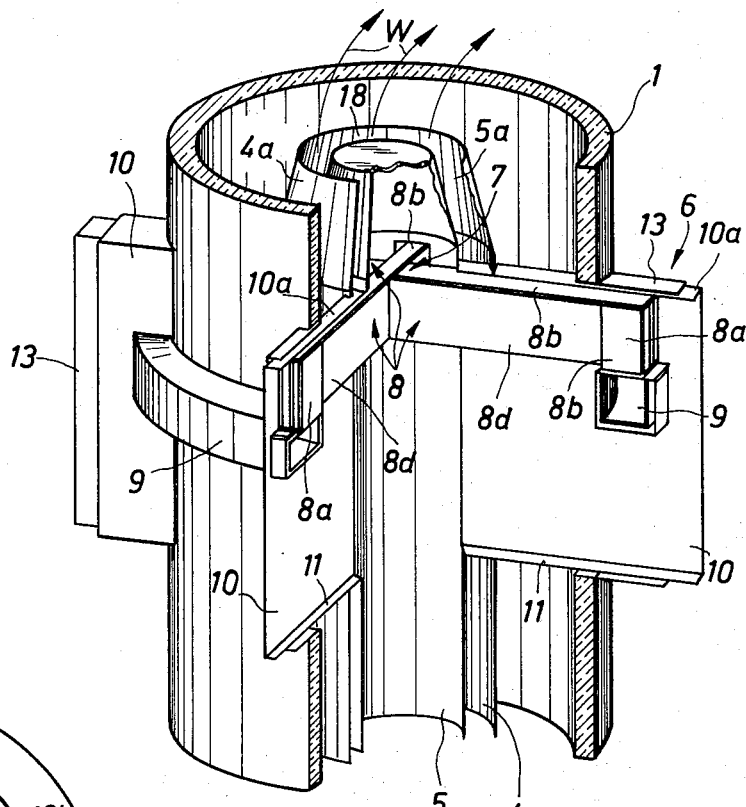
FIG. 5 is an isometric view of a portion of the supporting cross and the corresponding connecting pipe boxes.
Figure 4:
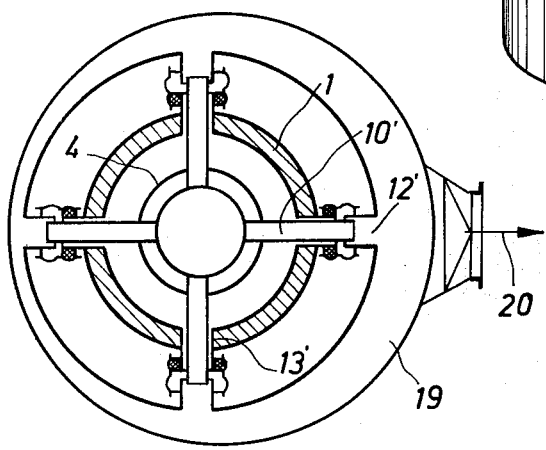
FIG. 4 is a section taken along the line IV — IV of FIG. 2.
Figure 3:
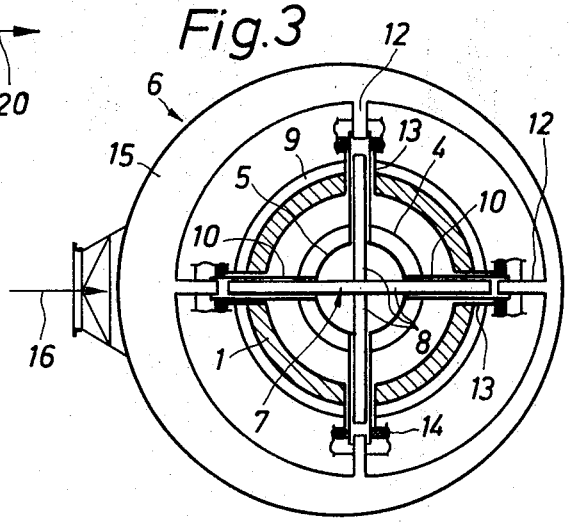
FIG. 3 is a section taken along the line III—III of FIG. 1.
Figure 6:
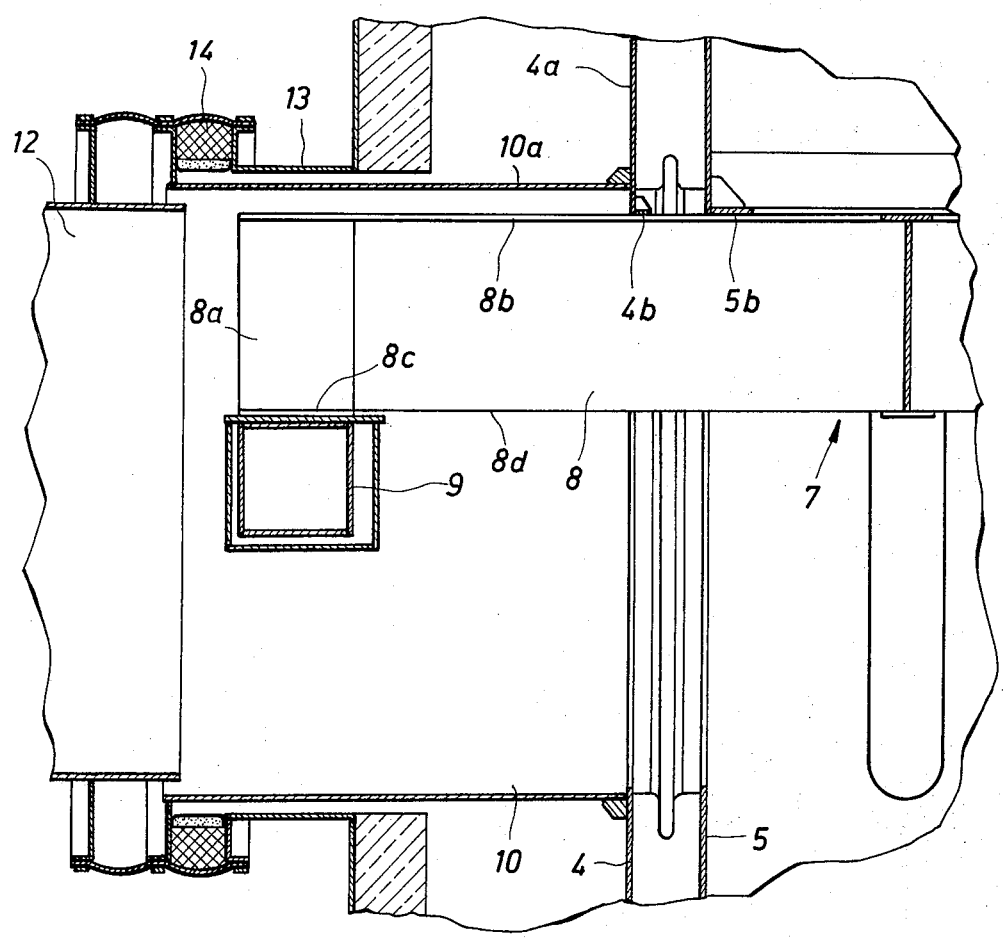
FIG. 6 is a cutout of the upper portion of the recuperator according to a further embodiment of the invention.

Instead of being withdrawn through an upper collecting chamber as illustrated in FIG. 1, the heated up fluid may also be withdrawn from the intermediate chamber 18 between the mantles 4 and 5 in the direction of the arrows W through a funnel-shaped headpiece as shown in FIG. 5.

It is, of course, to be understood that the present invention is, by no means, limited to the particular showing in the drawings but also comprises any modifications within the scope of the appended claims.

What I claim is:

1. A mantle-radiation recuperator structure, which includes: recuperator mantle means of predetermined diameter adapted to be inserted into a chimney and including a mantle for conveying fluid to be heated up, and cooled supporting means connected to said mantle means and adapted to hold said mantle means suspended centrically in a chimney having a diameter greater than the diameter of said mantle means.

2. A recuperator structure according to claim 1, which includes connecting pipe boxes having a diameter greater than that of the ends of said supporting means, and distributing chamber means for receiving and distributing the fluid to be heated up, and in which the ends of said supporting means extend through said connecting pipe boxes between the mantle for conveying fluid to be heated up and said distributing chamber means.

3. A recuperator structure according to claim 2, in which said supporting means are arranged crosswise and symmetrically with regard to said mantle means.

4. A recuperator structure according to claim 3, which includes an annular member adapted to be placed on a portion of a chimney in which the recuperator is to be suspended, said annular member extending through said connecting pipe boxes at about half the height thereof, and being adapted to support the outer ends of said supporting means.

5. A mantle-radiation recuperator according to claim 4, which includes a displacement body extending into said mantle means.

6. A recuperator according to claim 1, which includes additional mantle means extending into said first mentioned mantle means.

7. A recuperator according to claim 5, in which said displacement body is arranged on said supporting means.

8. A recuperator according to claim 6, in which said additional mantle means is arranged on said supporting means.

9. A recuperator according to claim 8, which includes a collecting chamber, and in which said mantle means extend beyond said supporting means in upward direction and communicates with the interior of said collecting chamber.

* * * * *

UNITED STATES PATENT OFFICE
CERTIFICATE OF CORRECTION

Patent No. 3,829,277          Dated August 13, 1974

Inventor(s) Hans-Rudiger Scheunemann

It is certified that error appears in the above-identified patent and that said Letters Patent are hereby corrected as shown below:

In Item [73] Assignee, should read -- Kleinewefers Industrie-Companie GmbH, Krefeld, Germany --; On the cover sheet insert -- [30] Foreign Application Priority Data January 11, 1972      Germany      P 22 01 090.8 --.

Signed and sealed this 14th day of January 1975.

(SEAL)
Attest:

McCOY M. GIBSON JR.        C. MARSHALL DANN
Attesting Officer           Commissioner of Patents